United States Patent
Kaltenegger et al.

(10) Patent No.: US 8,943,303 B2
(45) Date of Patent: Jan. 27, 2015

(54) MONITORING CIRCUIT WITH A WINDOW WATCHDOG

(75) Inventors: Martin Kaltenegger, Graz (AT); Michael Hausmann, Gleisdorf (AT)

(73) Assignee: Infineon Technologies AG, Neubiberg (DE)

( * ) Notice: Subject to any disclaimer, the term of this patent is extended or adjusted under 35 U.S.C. 154(b) by 329 days.

(21) Appl. No.: 13/542,511

(22) Filed: Jul. 5, 2012

(65) Prior Publication Data

US 2014/0013150 A1    Jan. 9, 2014

(51) Int. Cl.
    *G06F 11/30*    (2006.01)
    *G06F 11/07*    (2006.01)

(52) U.S. Cl.
    CPC .................. *G06F 11/0757* (2013.01)
    USPC ............................ 713/100; 714/55

(58) Field of Classification Search
    CPC .................................... G06F 11/0757
    USPC ............................ 713/100; 714/55
    See application file for complete search history.

(56) References Cited

U.S. PATENT DOCUMENTS

| | | | |
|---|---|---|---|
| 4,227,798 A | 10/1980 | Steiner | |
| 4,276,451 A | 6/1981 | Beebe et al. | |
| 4,514,846 A | 4/1985 | Federico et al. | |
| 4,683,530 A | 7/1987 | Quatse | |
| 4,733,923 A | 3/1988 | Dahnert | |
| 5,130,710 A | 7/1992 | Salazar | |
| 5,897,596 A | 4/1999 | Kabune et al. | |
| 6,385,743 B1 * | 5/2002 | Huckfeldt et al. | 714/51 |
| 7,225,369 B2 | 5/2007 | Schumacher et al. | |
| 8,458,533 B2 * | 6/2013 | Lavery | 714/55 |

FOREIGN PATENT DOCUMENTS

| | | |
|---|---|---|
| EP | 0 658 842 A1 | 6/1995 |
| EP | 0 996 060 A2 | 4/2000 |
| GB | 1 458 200 A | 12/1976 |
| JP | 59-020061 A | 2/1984 |

OTHER PUBLICATIONS

Ghosh, A., et al., "Safety Evaluation Using Behavioral Simulation Modes," Proceedings of IEEE Annual Reliability and Maintainability Symposium, 1996, pp. 82-89.

Hughes-Fenchel, G., "A Flexible Clustered Approach to High Availability," Twenty-Seventh Annual International Symposium on Fault-Tolerant Computing, FTCS-27, Digest of Papers, Jun. 24-27, 1997, pp. 314-318.

(Continued)

*Primary Examiner* — Albert Wang
(74) *Attorney, Agent, or Firm* — Slater & Matsil, L.L.P.

(57) ABSTRACT

A method of monitoring a processing circuit is disclosed. The processing circuit is operable, in a normal operation mode, to generate a sequence of trigger commands, with at least one trigger command of the sequence of trigger commands including time information. At least one window sequence with a closed window period and an open window period is generated such that the duration of the closed window period and/or the open window period is defined, at least in part, by the time information. It is detected if one trigger command is received within the open window period of the at least one sequence.

17 Claims, 6 Drawing Sheets

(56) References Cited

OTHER PUBLICATIONS

Mahmood, A., et al., "Concurrent Error Detection Using Watchdog Processors—A Survey," IEEE Transactions on Computers, vol. 37, No. 2, Feb. 1988, pp. 160-174.

Majzik, I., "Concurrent Error Detection Using Watchdog Processors," downloaded from http://home.mit.bme.hu/~majzik/wp/conerr/, Sep. 12, 2012, 26 pages.

"Processor Supervisory Circuits with Window-Watchdog," Texas Instruments Production Data, SLVS331E, Dec. 2000, 18 pages.

* cited by examiner

MONITORING CIRCUIT WITH A WINDOW WATCHDOG

TECHNICAL FIELD

Embodiments of the present invention relate to a monitoring circuit, in particular a monitoring circuit with a window watchdog.

BACKGROUND

A window watchdog provides timing supervision for processing circuits (processors), such as CPUs (Central Processor Units), DSPs (Digital Signal Processors), microcontrollers, or other processor based systems. A conventional window watchdog is configured to receive a trigger information from the signal processing circuit and is configured to detect whether the trigger information has been received within a first time window, known as closed window, or within a second time window, known as open window. The watchdog may reset the signal processing circuit when the trigger information has been received in the closed window.

In a conventional watchdog, the open and closed windows are generated in the watchdog based on timing information stored in the watchdog, so that the timing information is fixed once it has been programmed into the watchdog.

There is a need to provide a supervisory circuit with a window watchdog that can be easily synchronized to the supervised processing unit in the normal operation of the window watchdog.

SUMMARY OF THE INVENTION

A first embodiment relates to a monitoring circuit including a watchdog device. The watchdog device is operable to receive a sequence of timely distant trigger commands, with at least one trigger command including at least one time information, to generate a sequence with a closed window period and an open window period upon receipt of each trigger command such that the duration of at least one of the closed window period and the open window period is defined by the time information, to detect if one trigger command is received within an open window period, and to provide a status information based on the detection.

A second embodiment relates to a monitoring circuit including a watchdog device. The watchdog device is operable to receive a sequence of trigger commands, with at least one trigger command of the sequence of trigger commands including at least time information, to generate at least one window sequence with a closed window period and an open window period such that the duration of at least one of the closed window period and the open window period is defined by the at least time information, and to detect if one trigger command is received within the open window period of the at least one sequence.

A third embodiment relates to a circuit arrangement including a processing circuit operable, in a normal operation mode, to generate a sequence of trigger commands, with at least one trigger command of the sequence of trigger including at least time information, and a monitoring circuit including a watchdog device. The watchdog device is operable to receive the sequence of trigger commands, to generate at least one window sequence with a closed window period and an open window period such that the duration of at least one of the closed window period and the open window period is defined by the at least time information, and to detect if one trigger command is received within the open window period of the at least one sequence.

BRIEF DESCRIPTION OF THE DRAWINGS

Examples will now be explained with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF ILLUSTRATIVE EMBODIMENTS

In the following Detailed Description, reference is made to the accompanying drawings, which form a part thereof, and in which is shown by way of illustration specific embodiments in which the invention may be practiced.

Figure 1:
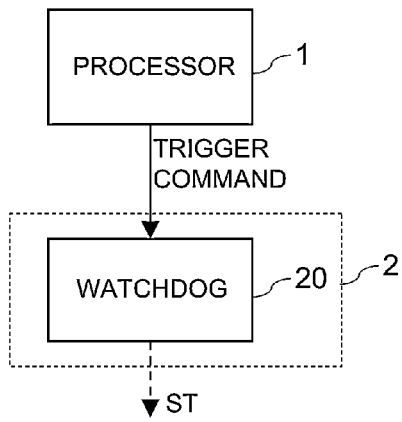
FIG. 1 illustrates a circuit arrangement with a monitoring circuit that includes a watchdog device.

FIG. 1 schematically illustrates a circuit arrangement with a processor 1 and a monitoring circuit 2. The processor 1 may be a conventional processor, such as digital signal processor (DSP), a microcontroller, or any other type of processor based system. According to one embodiment, the processor is implemented in a safety-critical industrial or automotive system such as, e.g., a passenger protection system (restrain system, ABS, etc.) in an automobile.

The monitoring circuit 2 serves to monitor the operation of the processor 1, so as to be able to detect failures in the operation of the processor 1. In particular, in safety-critical systems, monitoring the processor is of utmost relevance. The monitoring circuit 2 includes a watchdog 20, in particular a window watchdog, which is configured to receive a sequence of trigger commands from the processor 1. The processor, in a normal operation mode, is configured to generate a sequence of trigger commands.

Like a conventional window watchdog, watchdog 20 receives the trigger commands and monitors if the individual trigger commands meet specific timing requirements. In particular, watchdog 20 monitors if each of the received trigger commands is received within a predefined second time period (known as open window period or open window), or is received within a predefined first time period (known as closed window period or closed window. It is assumed that the processor 1 is working properly when the trigger commands are received within open windows, while it is assumed that there is a failure when a trigger command is received within a closed window or when no trigger command is received in an open window (i.e., before the end of the open window period). In a conventional window watchdog the duration of the closed window periods and the open window periods are predefined, e.g., by programming suitable time information into the window watchdog. Changing this time information in order to change the duration of the closed window periods and the open window periods requires to interrupt monitoring of the processor operation, to re-configure the window watchdog, and to again to synchronize the watchdog with the processor.

In the circuit arrangement of FIG. 1, the processor 1 is configured to provide a sequence of trigger commands, with at least one trigger command including at least one time information. The watchdog 20 is configured to receive the sequence of timely distant trigger commands and, upon receipt of each trigger command, to generate a sequence with a closed window period and an open window period such that the duration of at least one of the closed window period and open window period is defined by the time information included in the at least one trigger command including the time information. The watchdog 20 is further configured to detect if one trigger command is received within the open window period defined by the time information.

According to one embodiment, each trigger command includes at least one time information. In this embodiment, the watchdog 20 is configured to receive the sequence of timely distant trigger commands and, upon receipt of each trigger command, to generate one sequence with a closed window period and an open window period such that the duration of at least one of the closed window period and open window period is defined by the time information included in the trigger command. The watchdog 20 is further configured to detect if one trigger command is received within the open window period defined by the time information included in the preceding trigger command. The "preceding trigger command" is the trigger command of the sequence directly received before. The watchdog 20 further provides a status information ST based on this detection.

The operating principle of a watchdog 20 that is configured to receive a sequence of trigger commands, with each trigger command including at least one time information is explained with reference to FIGS. 2 to 4 below.

Figure 2:
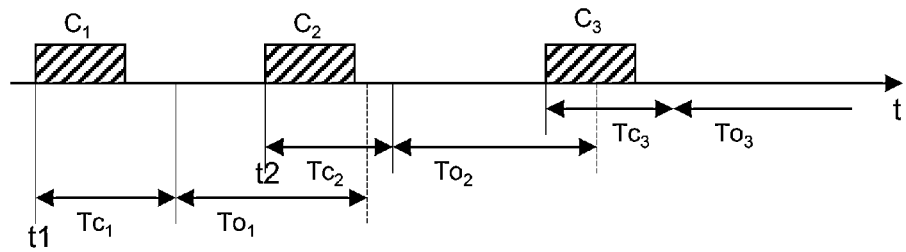
FIG. 2 shows timing diagrams illustrating the operating principle of the watchdog device in a normal operation mode according to a first embodiment.

FIG. 2 shows a timing diagram illustrating a sequence of trigger commands as received by the window watchdog 20. FIG. 2 schematically illustrates three trigger commands $C_1$, $C_2$, $C_3$ that are received by the watchdog 20 at different times (time instances) t1, t2, t3. As one trigger command is received by the watchdog 20, a sequence with a closed window period and with an open window period subsequent to the closed window period starts. E.g., when a first trigger command $C_1$ is received, a sequence with a first closed window period and with a first open window period starts. In FIG. 2, $Tc_1$ denotes the duration of the closed window period, and $To_1$ denotes the duration of the open window period.

In the following, the wording "window sequence" denotes a sequence with a closed window period and a subsequent open window period. A window sequence that starts when a trigger command is received, will be referred to as window sequence triggered by that trigger command. Further, just for explanation purposes it is assumed that the time when the trigger command is received is the time when the trigger command starts. However, this is only an example. The time when the trigger command is received could also be the time at the end of the trigger command or somewhere in the middle of the command. A window sequence starts each time a trigger command is received, independent of whether the trigger command is received in an open window period or in a closed window period.

The time information of at least one of the closed window period and the open window period of one window sequence is included in the trigger command that triggers the window sequence. E.g., in the embodiment of FIG. 2, a time information of at least one of the duration $Tc_1$ of the closed window period and the duration $To_1$ of the open window period is included in the first trigger command $C_1$.

In the following, $C_i$ denotes one of the trigger commands $C_1$-$C_3$ when reference to a specific one of these trigger commands is not required. $Tc_i$ denotes the duration of the closed window period defined by this trigger command $C_i$ and $To_i$ denotes the duration of the open window period defined by the trigger command $C_i$. In the following $C_{i+1}$ denotes the trigger commend that directly follows (succeeds) the trigger commend $C_i$ in the trigger command sequence. $C_i$ is the trigger command that precedes trigger command $C_{i+1}$.

According to one embodiment, one trigger command $C_i$ includes the time information of only one of the closed window period and the open window period. According to a further embodiment, one trigger command $C_i$ includes time information for both, the closed window period and the open window period in the window sequence triggered by the trigger command $C_i$. The window watchdog 20 is configured to detect if a trigger command $C_{i+1}$ succeeding the trigger command $C_i$ is received within the open window $To_i$ as defined by the trigger command $C_i$. The watchdog 20 (and the processor 1) is in the normal operation mode as long as each trigger command $C_{i+1}$ is received within the open time period defined by the preceding trigger command $C_i$.

FIG. 2 illustrates an embodiment of a time sequence in the normal operation mode. The second trigger command $C_2$ triggers a new window sequence with a closed time period $Tc_2$ and an open time period $To_2$. This window sequence starts when the trigger command $C_2$ is received, which, in this embodiment, is prior to the expiration of the open time period $To_1$. Referring to FIG. 2, a further trigger command $T_2$ is received within the open time period $To_2$ as defined by the trigger command $C_2$. Just for explanation purposes it is assumed that the time when a trigger command is received and a window sequence starts corresponds to a time at which the trigger command starts.

In the circuit arrangement of FIG. 1, the processor 1, dependent on a instantaneous operation state, may define the closed window period and the open window period in each monitoring cycle, where one monitoring cycle includes one window sequence with a closed window period and an open window period. Defining the windows with each trigger command is part of the normal operation of this circuit arrangement, so that no interrupt is required in order to adjust the closed window period and the open window period in the watchdog 20. In this circuit, the processor 1 may easily synchronize the watchdog 20 to the operation of the processor by adjusting the duration of the open window and the closed window periods.

Figure 3:
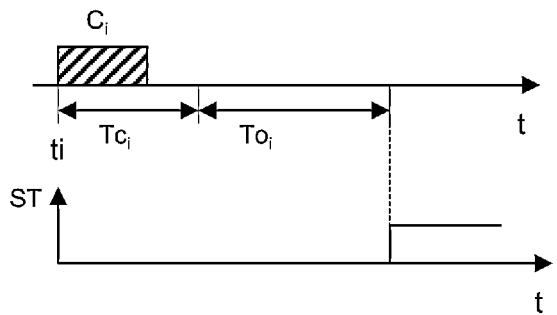
FIG. 3 shows timing diagrams illustrating the operating principle of the watchdog device in a first failure mode.
Figure 4:
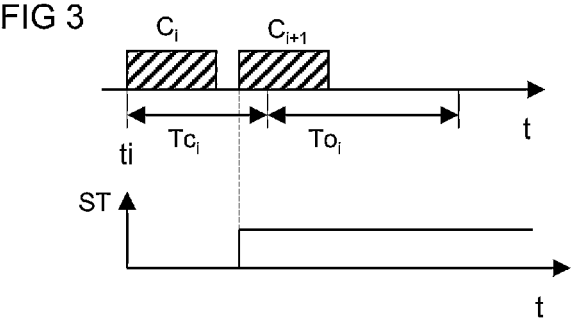
FIG. 4 shows timing diagrams illustrating the operating principle of the watchdog device in a second failure mode.

FIGS. 3 and 4 illustrate timing diagrams in a failure mode of the processor 1. A failure mode is an operation mode in which there is a failure in the processor 1 such that there is a timing failure in forwarding the trigger commands to the watchdog 20. FIG. 3 illustrates a first timing failure. In this case, a trigger command is not received within the open window period $To_i$ defined by trigger command $C_i$. Referring to FIG. 4, a second failure occurs, when a trigger command $C_{i+1}$ is received in the closed window period $Tc_1$ defined by the preceding trigger command $C_1$.

Referring to FIG. 1, the watchdog 20 may provide a status information ST indicating whether the watchdog 20 and the processor 1 are in the normal operation mode or whether a failure has occurred. The status information ST may be evaluated by further circuitry (not illustrated in FIG. 1) that is operable to take suitable measures such as, e.g., resetting the processor 1, sending an alert information to an operator, or the like. According to one embodiment, the status information ST is represented by a signal that assumes one of two signal levels, namely a normal operation level and a failure level. An embodiment of such status information signal is illustrated in FIGS. 3 and 4. In the embodiment, a normal operation level of the status signal is a low signal level, while a failure level is a high signal level. However, this is only an example. The low signal level could also represent a failure, while the high signal level could represent the normal operation.

According to a further embodiment, the status signal ST does not only indicate whether or not a failure has occurred, but at the end of each window sequence indicates whether or not a failure has occurred. According to one embodiment, the status signal ST includes a signal pulse at the end of each window sequence when no failure has occurred in the window sequence.

According to a further embodiment of the monitoring circuit 2 and the monitoring method, respectively, not each of the trigger commands includes the at least one time information, but there are two types of trigger commands, namely trigger commands including at least one time information, and trigger commands including no time information. In this embodiment, upon receipt of a trigger command including the at least one time information, window sequences are generated based on the time information until another trigger command including a time information is received. The operating principle of the monitoring circuit 2 according to this embodiment is explained with reference to FIG. 5 below.

Figure 5:
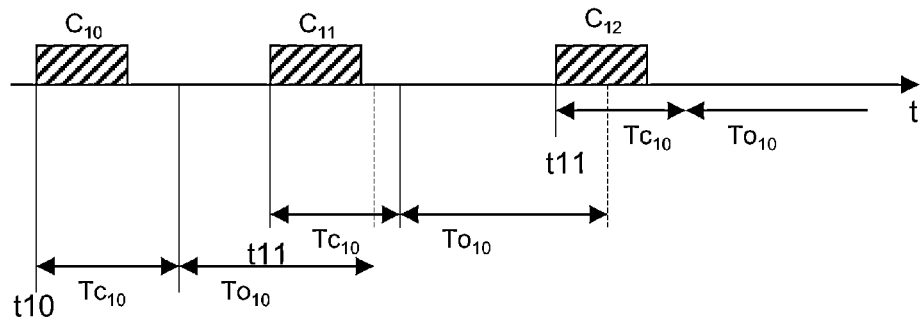
FIG. 5 shows timing diagrams illustrating the operating principle of the watchdog device in a normal operation mode according to a second embodiment.

FIG. 5 shows a timing diagram illustrating a sequence of trigger commands as received by the window watchdog 20. FIG. 5 schematically illustrates three trigger commands $C_{10}$, $C_{11}$, $C_{13}$ that are received by the watchdog 20 at different times (time instances) t11, t12, t13. As one trigger command is received by the watchdog 20, a window sequence with a closed window period and with an open window period. The time information required for generating the window sequence is included in one of the trigger commands. For explanation purposes it is assumed that a first trigger command $C_{11}$ illustrated in FIG. 5 is a time-defining or window-defining trigger command, while the other trigger commands illustrated in FIG. 5 are non-window-defining trigger commands. That is, only the first trigger command includes at least one time information defining at least one of the duration of the open window period and the closed window period.

The window defining trigger command $C_{10}$ may include the time information of only one of the closed window period and the open window period, or may include time information for both, the closed window period and the open window period.

The at least one time information included in the window-defining trigger command $C_{10}$ is used for generating the window sequences until a further (new) window-defining trigger command is received. Referring to FIG. 5, a new window sequence with a closed window period and an open window period starts each time a window-defining or a non-window-defining trigger command is received, where the time information required for generating the window sequence is the time information that was included in the last received window-defining trigger command.

In the embodiment illustrated in FIG. 5, $C_{10}$ is a window-defining trigger command, while trigger commands $C_{11}$, $C_{12}$ received after trigger command $C_{10}$ are non-window-defining trigger commands. As the window-defining trigger command $C_{10}$ is received a sequence with a first closed window period and with a first open window period starts. In FIG. 5, $Tc_{10}$ denotes the duration of the closed window period, and $To_{10}$ denotes the duration of the open window period. A new window sequence with a closed window period defined by $Tc_{10}$ and an open window period defined by $To_{10}$ starts each time a trigger command is received in the open window period triggered by a preceding trigger command. The time information for generating the window sequence is updated when a new window-defining trigger command is received.

FIG. 5 illustrates an embodiment of a time sequence in the normal operation mode. A second trigger command $C_{12}$ triggers a new window sequence with a closed time period $Tc_{10}$ and an open time period $To_{10}$ as defined by the window-defining trigger command. This window sequence starts when the trigger command $C_{12}$ is received, which, in this embodiment, is prior to the expiration of the open time period $To_1$. Referring to FIG. 2, a further trigger command $C_{12}$ is received within the open window period $To_{10}$ of the window sequence triggered by trigger command $C_{11}$. Just for explanation purposes it is assumed that the time when a trigger command is received corresponds to a time at which the trigger command starts.

In the circuit arrangement of FIG. 1, the processor 1, dependent on a instantaneous operation state, may define the closed window period and the open window period in each monitoring cycle or after several monitoring cycles, where one monitoring cycle includes one window sequence with a closed window period and an open window period. Defining the windows with each trigger command or after several trigger commands is part of the normal operation of this circuit arrangement, so that no interrupt is required in order to adjust the closed window period and the open window period in the watchdog 20. In this circuit, the processor 1 may easily synchronize the watchdog 20 to the operation of the processor by adjusting the duration of the open window and the closed window periods.

Figure 6:
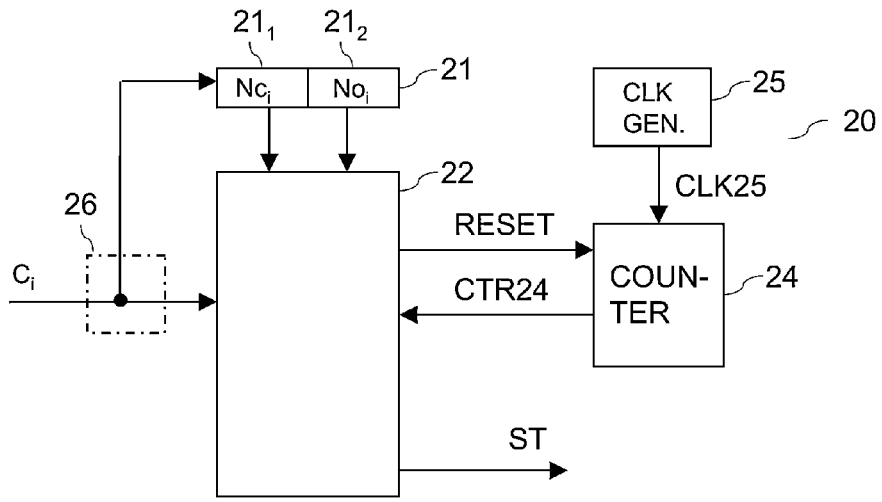
FIG. 6 shows a block diagram of the watchdog device according to one embodiment.

FIG. 6 illustrates a block diagram of one embodiment of the watchdog 20. The individual function blocks of this watchdog may be implemented using a conventional technology in order to implement the functionality of the watchdog 20. That is, these function blocks may be implemented as analog circuits, digital circuits or may be implemented using hardware and software such as using a microcontroller on which a specific software is running.

Referring to FIG. 6, the watchdog 20 includes a storage unit 21 such as a register for storing at least one time information. The storage unit 21 of FIG. 6 includes two storage areas, namely a first storage area $21_1$ for storing a first time information $Nc_i$, and a second storage area for storing a second time information $No_n$. In this embodiment, the first time information $Nc_i$ is a time information for defining a closed window period, while the second time information $No_i$ defines the open window period. These time information $Nc_i$, $No_i$ may be included in each trigger command received by the watchdog 20 or may be included only in some trigger commands (window-defining trigger commands). Each time a window-defining trigger command $C_i$ is received by the watchdog 20 the time information is extracted from the trigger command and is stored in the storage unit 21. When the monitoring circuit 2 is used in a system in which the processing unit 1 only sends window-defining trigger commands, the watchdog 20 can be configured to extract the time information included in each trigger command, so that no differentiation between window-defining and non-defining trigger commands is required. When, however, window-defining and non-window-defining trigger commands are used, the watchdog 20 may include an input detector 26 that is configured to detect window-defining trigger commands and stores the at least one time information included in one window-defining trigger command in the register.

A processing unit 22 receives each trigger command $C_i$ so as to detect the time when the trigger command is received, and receives the time information $Nc_i$, $No_i$ stored in the storage unit 21. The closed window period starts as soon as the trigger command is received. At the beginning of the closed window period after a window-defining trigger command has been received, the time information $Nc_i$, $No_i$ are stored in the storage unit 21 so that these time information are available to the processing unit 22 within the closed window period. According to one embodiment, the first time information $Nc_i$ is representative of a time duration between the beginning of the window sequence, which is the time when a trigger command is received, and the end of the closed window period. The second time information $No_i$ represents a time duration between the time when the trigger command is received and the end of the open window period. These time information are kept in the register 21 until a new time information is received which may be with receipt of every trigger command, or only with receipt of one of a plurality of trigger commands.

The watchdog 20 further includes a counter 24 operable to receive a clock signal CLK25 from a clock generator 25, to be reset by the processing unit 22, and to provide a counter reading CTR24 to the processing unit 22. The operating principle of the watchdog 20 of FIG. 6 is explained with reference to FIG. 7 below.

Figure 7:
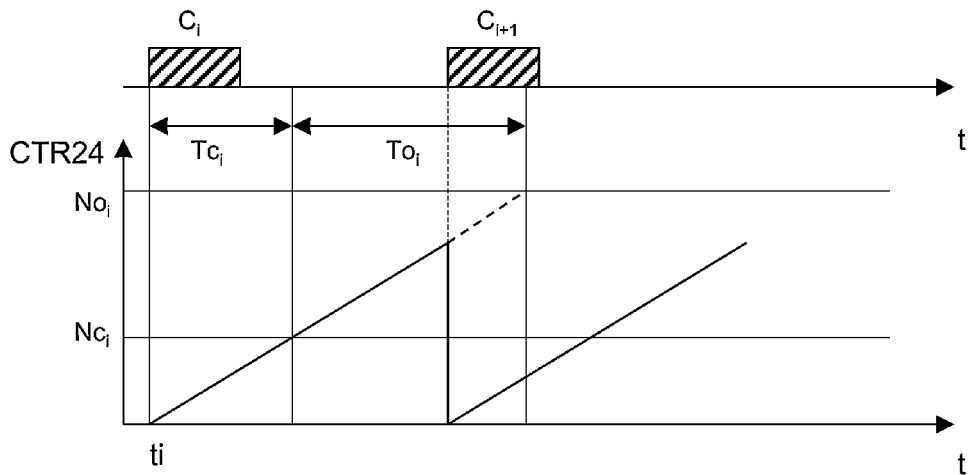
FIG. 7 shows timing diagrams illustrating the operating principle of the watchdog device of FIG. 6.

FIG. 7 illustrates timing diagrams of a sequence of trigger commands and of the counter reading CTR24 of the counter 24. In this embodiment, the counter 24 is operable to be incremented by the clock signal CLK25 after a reset. However, the counter 24 could also be operable to be decremented by the clock signal CLK25. In FIG. 7, for simplicity of illustration, the counter reading CTR24 increases linearly. In fact, the counter reading increases in discrete steps.

In FIG. 7, ti denotes a time when a trigger command Ci is received by the watchdog 20. At this time the processing unit 22 resets the counter 24 and the counter 24 begins to count in a clocked fashion driven by the clock signal CLK25. In the present embodiment, the counter counts up. At the beginning of the closed window period $Tc_i$ the first and second time information $Nc_i$, $No_i$ are stored in the storage unit 21. In this embodiment, the first time information $Nc_i$ represents that counter reading the counter 24 has when the closed window period ends, and the second time information $To_i$ represents that counter reading the counter 24 has when the open window period $To_i$ ends. This relationship is also illustrated in FIG. 7.

In order to detect is a trigger command $C_{i+1}$ is received within the open window period $To_i$, the processing unit 22 at the time the trigger command $C_{i+1}$ is received compares the instantaneous counter reading CTR24 with the values $Nc_i$, $No_i$ representing the time information. When the instantaneous counter reading is between $Nc_i$ and $No_i$, i.e. when $Nc_i < CTR24_{i+1} < No_i$, where $CTR24_{i+1}$ represents the instantaneous counter reading at the time the trigger command $C_{i+1}$ is received, then the trigger command $C_{i+1}$ has been received within the open window period and the processing unit 22 resets the counter 24 so as to start a new window sequence. In the embodiment illustrated in FIG. 7, the trigger command $C_{i+1}$ is received within the open window period.

A first failure is detected by the processing unit 22 when the counter reading CTR24 reaches the value $No_i$ representing the end of the open window period, and the second failure is detected, when the instantaneous counter reading $CTR24_{i+1}$ at the time the trigger command $C_{i+1}$ is received is below the value $Nc_i$ representing the end of the closed window period. Referring to FIG. 6, the processing unit 22 generates a status signal ST. The status signal ST may be generated such that it represents an information on the operation mode. That is, the status signal may indicate whether the watchdog 20 is in a normal operation mode or whether a failure has been detected.

Figure 8:
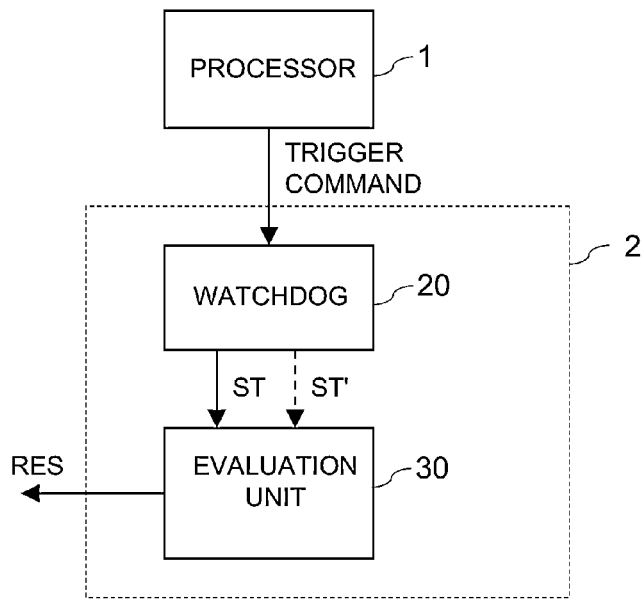
FIG. 8 shows a block diagram of a monitoring circuit including a watchdog device and a status evaluation circuit.

FIG. 8 illustrates a further embodiment of a monitoring circuit 2. In this embodiment, the monitoring circuit 2 includes an evaluation circuit 30 that receives the status signal ST from the watchdog 20 and that is configured to generate a reset signal RES or any other type of alert signal. In this embodiment, the watchdog 20 is configured to generate a signal pulse of the status signal ST each time a trigger command $C_{i+1}$ is received in an open window period.

Figure 9:
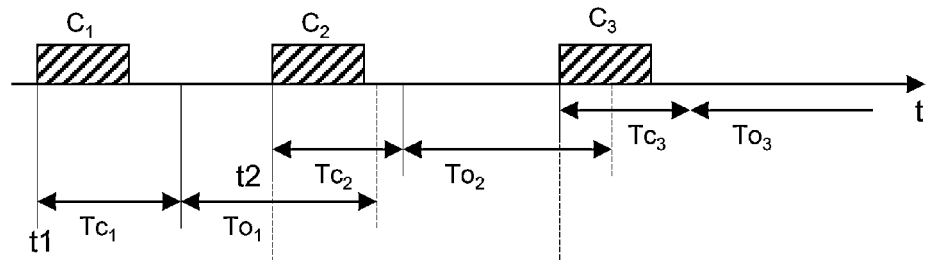
FIG. 9 shows timing diagrams illustrating the operating principle of the watchdog device of FIG. 8 when implemented in accordance with a first embodiment.

FIG. 9 shows timing diagrams of a sequence of trigger commands $C_1$-$C_3$ in the normal operation mode. This sequence of trigger commands corresponds to the sequence explained with reference to FIG. 2. Referring to FIG. 9, the status signal ST includes a signal pulse each time a trigger command is correctly received in an open window period. The evaluation unit 30 may evaluate the number of signal pulses received within a predefined time period (and/or the mean frequency of the signal pulses) and may generate the reset (alert) signal when this number is below a threshold.

According to a further embodiment (not illustrated), two status signals are provided, namely a first status signal that corresponds to the status signal ST of FIG. 9 and includes a signal pulse each time a trigger command is correctly received in an open window period, and a second status signal that includes a signal pulse each time a trigger command is received in a closed window period or each time an open window period elapses without having received a trigger command.

Figure 10:
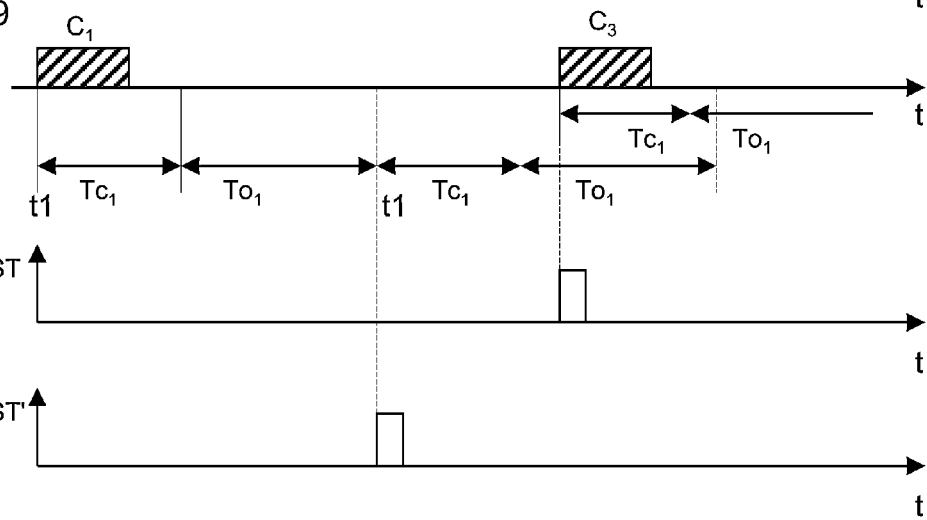
FIG. 10 shows timing diagrams illustrating the operating principle of the watchdog device of FIG. 8 when implemented in accordance with a second embodiment.

FIG. 10 shows exemplary timing diagrams of the trigger command and the status signals ST, ST'. In this embodiment, an open window period as triggered by a trigger command $C_1$ elapses without having received a trigger signal, so that a signal pulse of the second status signal ST' is generated. In this embodiment, a new window sequence starts at the end of the open window period of the preceding window sequence. The time information used for generating the window sequence is the time information that was included in the last received window-defining trigger command.

Figure 11:
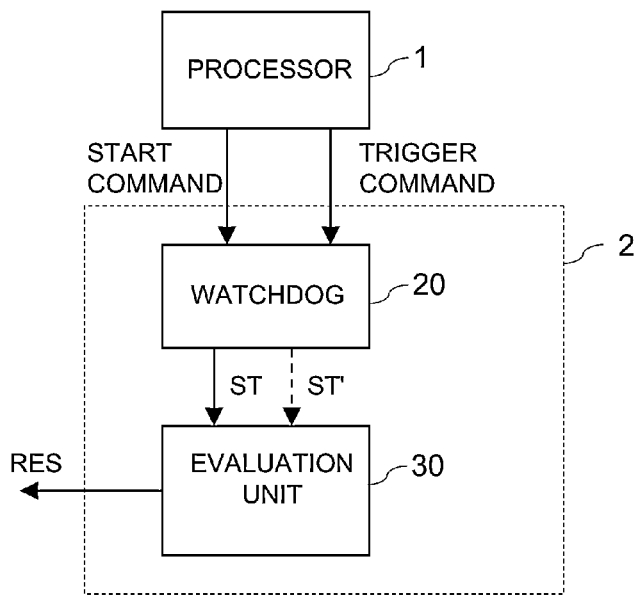
FIG. 11 shows a block diagram of a monitoring circuit with a watchdog device and an evaluation unit according to a further embodiment.

FIG. 11 illustrates a circuit arrangement with a processing circuit 1 and a monitoring circuit 2 according to a further embodiment. In this embodiment, the monitoring circuit 2 includes a watchdog 20 that is configured to receive two different types of trigger commands from the processing circuit 1, namely a window-defining trigger command (first type trigger command) and a non-window defining trigger command (second type trigger command). In the following, the first type trigger command will be referred to as "start command," while the second type trigger command will simply be referred to as "trigger command." The start command includes at least one time information that defines at least one of a closed window period and an open window period of a window sequence. Each time, the watchdog 20 receives a start command a window sequence with a closed window period and an open window period as defined by the at least one time information included in the start command starts. The watchdog then detects if a trigger command is received in the open window period. The operating principle of the watchdog 20 of FIG. 11 is explained with reference to FIG. 12 below.

Figure 12:
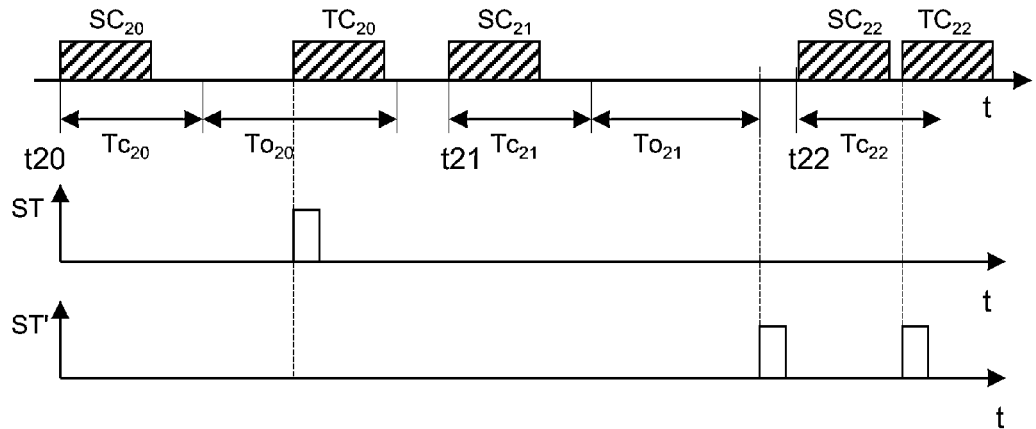
FIG. 12 shows timing diagrams illustrating the operating principle of the watchdog device of FIG. 11.

FIG. 12 illustrates timing diagrams of status signals ST, ST' provided by the watchdog 20. In FIG. 12, $t20$ denotes a time at which a first start command $SC_{20}$ is received. The start command $SC_{20}$ defines at least one of a closed window period an open window period in a window sequence triggered by the start command $SC_{20}$. Referring to FIG. 12, the watchdog 20 generates a signal pulse of the status signal ST each time a trigger command is received in the open window period defined by one start command. In FIG. 12, $Tc_{20}$ denotes the closed window period and $To_{20}$ denotes the open window period as defined by the start command $SC_{20}$. A first trigger command $Tc_{20}$ is received in the open window period, so that the status signal ST includes a signal pulse at the time the trigger command $Tc_{20}$ is received. The watchdog 20 is configured ti determine the type of trigger command that is received and to differentiate between a start command and a trigger command. In an open window as defined by a start command the watchdog expects to receive a trigger command. Only when a trigger command is received in an open window a signal pulse of the status signal ST is generated.

According to one embodiment, the watchdog 20, besides the status signal ST, generates a further status signal ST' that indicates when a failure has occurred. A failure could be that no trigger command is received within an open window period, or that a trigger command is received in a closed window period. In FIG. 12, $Sc_{21}$ denotes a further start command that defines a window sequence with a closed window period $Tc_{21}$ and an open window period $To_{21}$. In this open window period $To_{21}$ no trigger command is received, so that the second status signal ST' includes a signal pulse at the end of this open window period $To_{21}$. $Sc_{22}$ in FIG. 12 denotes a further start command. In FIG. 12, a trigger $T22$ is received in the closed window period $Tc_{22}$ as defined by the start command $Sc_{22}$. At this time, the second status signal ST' includes a signal pulse in order to indicate that a failure has occurred. When the watchdog receives a further start command in an open window as defined by a previous start command, a signal pulse of the further status signal is generated.

Referring to FIG. 11, an evaluation unit 30 receives the status signal ST and the optional further status signal ST' and generates a reset signal RES or any other type of alert signal dependent on these status signals ST, ST'.

Figure 13:
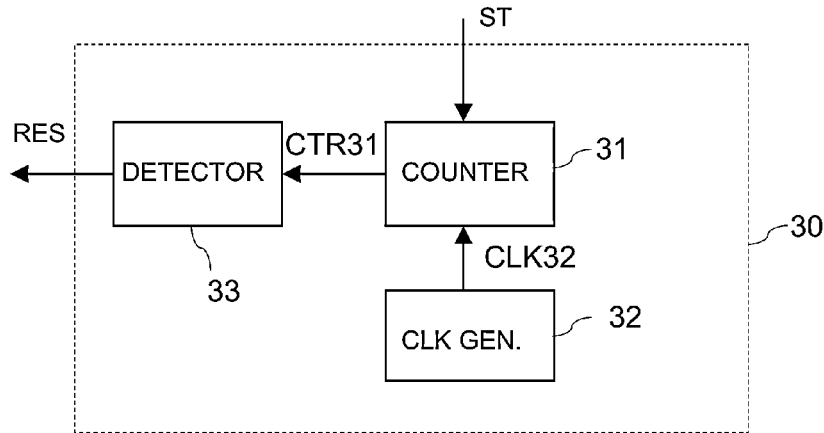
FIG. 13 illustrates one embodiment of the evaluation circuit of FIG. 11.

FIG. 13 illustrates an embodiment of an evaluation circuit 30 that receives the status signal ST and that generates a reset signal RES dependent on the status signal ST. Like in the embodiments explained before, the reset signal RES may be used to reset the processing circuit and/or the watchdog 20. Referring to FIG. 13, the evaluation circuit 30 includes a counter 31 with an incrementing input and a decrementing input. The status signal ST is received at one of the incrementing inputs and the decrementing inputs, while a clock signal CLK32 from a clock generator 32 is received at the other one of the incrementing inputs and the decrementing inputs. Just for explanation purposes it is assumed that the status signal ST is received at the incrementing input, while the clock signal CLK32 is received at the decrementing input. A counter reading CTR31 of the counter 31 is received by a detector 33 that is configured to compare the counter reading with a threshold. The detector 33 generates the reset signal RES such that the reset signal RES represents a failure, when the counter reading reaches the threshold.

Figure 14:
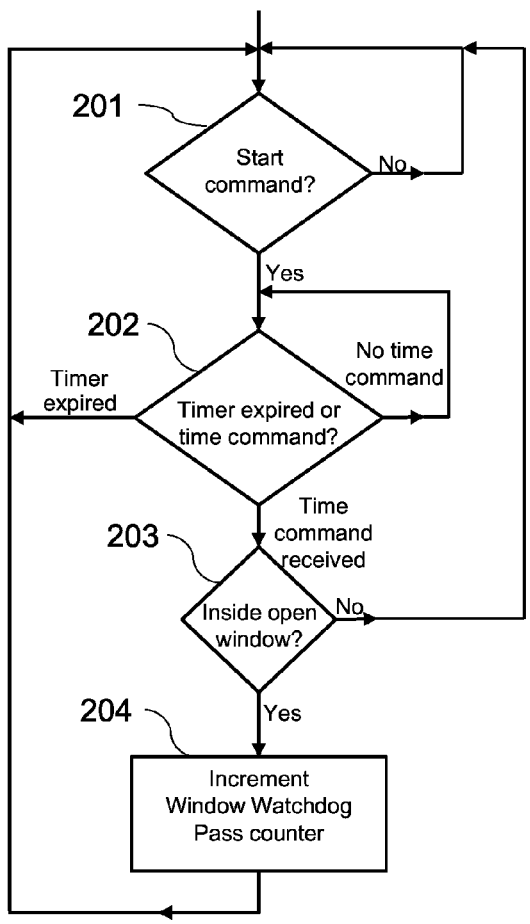
FIG. 14 shows a sequence of process steps illustrating the operating principle of the monitoring circuit of FIG. 11.

FIG. 14 shows a sequence of process steps illustrating the operating principle of the monitoring circuit of FIG. 11. Referring to FIG. 14, the monitoring circuit 2 waits for a start command in process step 201 and starts a window sequence when a start command is received. After a start command has been received, the monitoring circuit 2 then waits for a trigger command (time command) and, when a trigger command has been received, detects if the trigger command has been received in an open window (see step 203). When the trigger command has been received in an open window, the monitoring circuit 2 sends a pulse of the status signal ST that increments or decrements the counter 31. In the embodiment illustrated in FIG. 14, the counter is incremented each time a trigger command is received in an open window. When no trigger command has been received in an open window the monitoring circuit 2 returns to step 201 and waits for a new start command.

Figure 15:
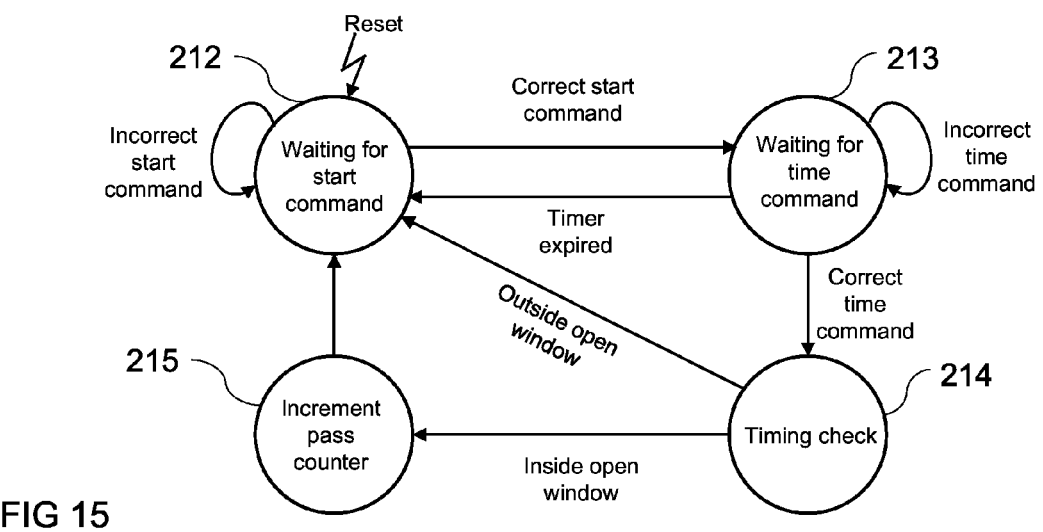
FIG. 15 shows a state diagram illustrating the operating principle of the monitoring circuit of FIG. 11.

FIG. 15 illustrates the operating principle of the monitoring circuit 2 by way of a state diagram. After reset, monitoring circuit 2 is in a first waiting state 212 and waits for a start command. When the start command has been received, the system changes to a second waiting state 213 in which the system waits for a trigger command (time command). The system stays in this second waiting state 213 until a correct trigger command is received or until the open window period elapses (or a timer defining the open window period elapses). When a trigger command is received, the monitoring circuit 2 checks in state 214 if the trigger command has been received in an open window. If the trigger command has been received in an open window, the system changes to state 215 in which the counter is incremented and then returns to the first waiting state 212. Otherwise, the system returns from timing check state 214 to the first waiting state 212.

Figure 16:
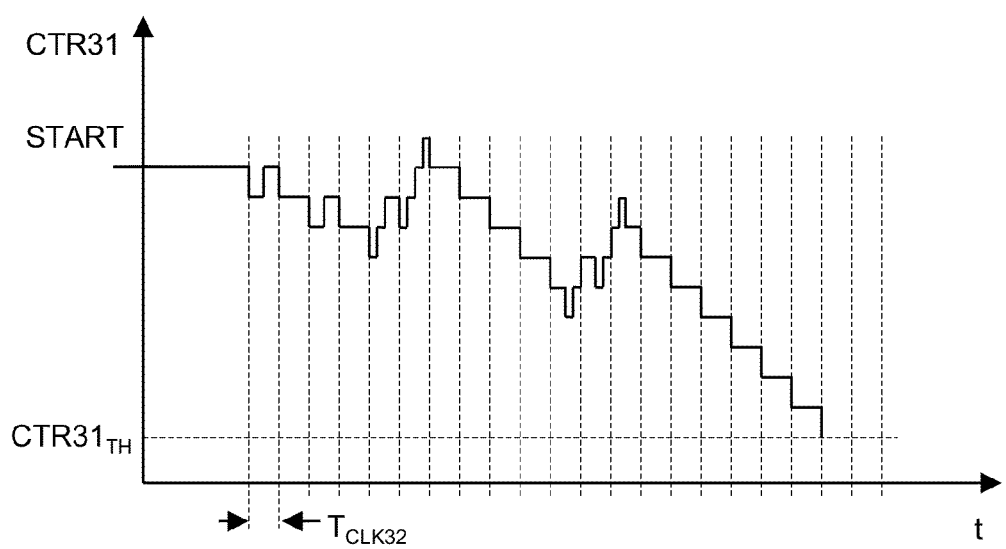
FIG. 16 shows a timing diagram illustrating the operating principle of the evaluation unit of FIG. 13.

FIG. 16 illustrates the operating principle of the evaluation unit of FIG. 13. FIG. 16 shows a counter reading CT31 of the counter 31 over time. For explanation purposes it is assumed that the counter 31 is incremented each time a trigger command is received in an open window and that the counter is periodically decremented by the clock signal CLK32. After start (reset) of the system the counter reading CT31 is periodically decremented by the clock signal CLK32 having a clock period $T_{CLK32}$. The counter reading CT31 is incremented each time a trigger command is received in an open window period, where these times are not synchronized with the clock signal CLK32. A failure may be detected when the counter reading CTR31 falls below a counter reading threshold CTR31$_{TH}$. This error may occur, when for a certain time period no trigger commands are detected in open window periods, so that the counter 31 is only decremented and finally reaches the threshold.

Implementing the evaluation unit 30 with a counter 31 as illustrated in FIG. 12 is only an example. In general, the evaluation unit 30 is configured to evaluate a frequency at which signal pulses (pass pulses) of the status signal ST are generated, and to generate the alert signal based on the evaluation. According to further embodiments, the evaluation unit 30 is configured to assert the alert signal when a mean frequency of the pass pulses as determined in a predefined time period is less than a predefined frequency value and/or when there is a predefined time period in which no pass pulses are received.

According to a further embodiment, the evaluation unit 30 is configured to determine a frequency spectrum of the status signal ST, using, e.g., an FFT (Fast Fourier Transform), to evaluate the spectrum and to assert the alert signal when the spectrum meets specific criteria.

Referring to the explanation above, there are different possible operation modes of the watchdog 20, namely:

a) A first operation mode in which the watchdog 20 once receives a window-defining trigger command and in which the watchdog 20 generates a plurality of subsequent window sequences using the time information included in the window-defining trigger command until a next window-defining trigger command is received. In this operation mode, a new window sequence starts each time a trigger command (window-defining or non-window-defining) is received in an open window, or after an open window period has expired. A pass pulse is generated each time a trigger command is received in an open window period. Optionally, a fail pulse is generated each time a trigger command is received in a closed window period, and each time an open window period expires without having received a trigger command.

b) A second operation mode in which each of the trigger commands is a window-defining trigger command that includes time information for only one window sequence. In this operation mode, a window sequence starts each time a trigger command is received. A pass pulse is generated each time a trigger command is received in an open window as defined by a previous trigger command. Optionally, a fail pulse is generated Optionally, a fail pulse is generated each time a trigger command is received in a closed window period, and each time an open window period expires without having received a trigger command.

c) A third operation mode in which there are window-defining and non-window-defining trigger commands. When the watchdog 20 receives a window-defining trigger command it generates only one window sequence based on the time information included in the window-defining trigger command and waits to receive a non-window defining trigger command in the open window. A pass pulse is generated each time, a non-window-defining trigger command is received in an open window as defined by the previous window-defining trigger command. Optionally, a fail pulse is generated each time a trigger command is received in a closed window period, each time a window-defining trigger command is received in an open window period, and each time an open window period expires without having received any trigger command.

According to one embodiment, the watchdog 20 is configured to operate in only one of these operation modes. According to a further embodiment, the watchdog 20 is programmable to operate in one of these three operation modes. In this embodiment, the watchdog 20 is further configured to receive an operation mode command indicating the desired operation mode. According to one embodiment, the operation mode command is included in the window-defining trigger command. E.g., in the first operation mode, the watchdog 20 is instructed with each window-defining trigger command to generate a plurality of window sequences based on the time information included in the trigger command, while in the third operation mode the watchdog 20 is instructed with each trigger command to generate only one window sequence.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc. and are also not intended to be limiting. Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of monitoring a processing circuit operable, in a normal operation mode, to generate a sequence of trigger commands, with at least one trigger command of the sequence of trigger commands including time information, the method comprising:
   generating at least one window sequence with a closed window period and an open window period such that the duration of the closed window period and/or the open window period is defined, at least in part, by the time information; and
   detecting if one trigger command is received within the open window period of the at least one sequence.

2. The method of claim 1, further comprising generating a status signal based on the detection.

3. The method of claim 1, wherein the processing circuit is operable, in the normal operation mode, to generate each trigger command of the sequence of trigger commands with at least one time information, the method further comprising:
   generating a window sequence with a closed window period and an open window period upon receipt of each trigger command such that at least one of the duration of the closed window period and the duration of the open window period is dependent on the at least one time information included in the received trigger command.

4. The method of claim 1, wherein the processing circuit is operable, in the normal operation mode, to generate a first one of a sequence of trigger commands with at least one time information, the method further comprising:
generating a series of window sequences with a closed window period and an open window period upon receipt of each trigger command such that at least one of the duration of the closed window period and the duration of the open window period in each sequence is dependent on the at least one time information included in the received first trigger command.

5. The method of claim 1, wherein the processing circuit is operable, in the normal operation mode, to generate the sequence of trigger commands such that the trigger commands alternately include and do not include at least one time information, the method further comprising:
upon receipt of a trigger command including at least one time information, generating only one window sequence with a closed window period and an open window period such that the duration of at least one of the closed window period and the open window period is dependent on the at least one time information.

6. The method of claim 1, wherein the at least one trigger command including at least one time information comprises a first time information for defining the duration of the closed window period and a second time information for defining the duration of the open window period.

7. The method of claim 5, further comprising evaluating a frequency at which trigger commands are detected in an open window period.

8. The method of claim 7, further comprising:
one of incrementing and decrementing a counter each time a trigger command is detected in an open window period and the other one of incrementing and decrementing periodically; and
generating an alert signal when a counter reading of the counter reaches a predefined threshold.

9. A monitoring circuit comprising a watchdog device, the watchdog device operable
to receive a sequence of trigger commands, with at least one trigger command of the sequence of trigger commands including at least time information,
to generate at least one window sequence with a closed window period and an open window period such that the duration of at least one of the closed window period and the open window period is defined by the at least time information; and
to detect if one trigger command is received within the open window period of the at least one sequence.

10. The monitoring circuit of claim 9, wherein the watchdog device is further operable to generate a status signal based on the detection.

11. The monitoring circuit of claim 9, wherein the watchdog device is further operable
to receive a sequence of trigger commands, with each trigger command of the sequence of trigger commands including at least one time information; and
to generate a window sequence with a closed window period and an open window period upon receipt of each trigger command such that at least one of the duration of the closed window period and the duration of the open window period is dependent on the at least one time information included in the received trigger command.

12. The monitoring circuit of claim 9, wherein the watchdog device is further operable
to receive a sequence of trigger commands, with a first one of the sequence of trigger commands including at least one time information; and
to generate a series of window sequences with a closed window period and an open window period upon receipt of each trigger command such that at least one of the duration of the closed window period and the duration of the open window period in each sequence is dependent on the at least one time information included in the received first trigger command.

13. The monitoring circuit of claim 9, wherein the watchdog device is further operable
to receive a sequence of trigger commands that alternately include and do not include at least one time information; and
upon receipt of a trigger command including at least one time information, to generate only one window sequence with a closed window period and an open window period such that the duration of at least one of the closed window period and the open window period is dependent on the at least one time information.

14. The monitoring circuit of claim 9, wherein the watchdog device is further operable
to generate the closed window period dependent on a first time included in the at least one trigger command including at least one time information; and
to generate the open window period dependent on a first time included in the at least one trigger command including at least one time information.

15. The monitoring circuit of claim 9, further comprising an evaluation unit configured to evaluate a frequency at which trigger commands are detected in an open window period.

16. The monitoring circuit of claim 15,
wherein the watchdog device is configured to generate a status signal including a signal pulse each time a trigger command is detected in an open window period; and
wherein the evaluation unit further comprises:
a counter comprising an incrementing input and a decrementing input, with one of the incrementing input and the decrementing inputs receiving the status signal;
a clock generator providing a clock signal, with the other one of the incrementing input and the decrementing input receiving the clock signal; and
a threshold detector receiving a counter reading of the counter, operable to compare the counter reading with a threshold, and to generate an alert signal based on the comparison.

17. A circuit arrangement comprising:
a processing circuit operable, in a normal operation mode, to generate a sequence of trigger commands, with at least one trigger command of the sequence of trigger commands including at least time information, the processing circuit comprising a monitoring circuit comprising a watchdog device, the watchdog device operable:
to receive the sequence of trigger commands,
to generate at least one window sequence with a closed window period and an open window period such that the duration of at least one of the closed window period and the open window period is defined by the at least time information, and
to detect if one trigger command is received within the open window period of the at least one sequence.

* * * * *